Feb. 19, 1957  J. GALANDAK  2,781,911
CLARIFIER CONSTRUCTION
Filed Aug. 2, 1954  2 Sheets-Sheet 1
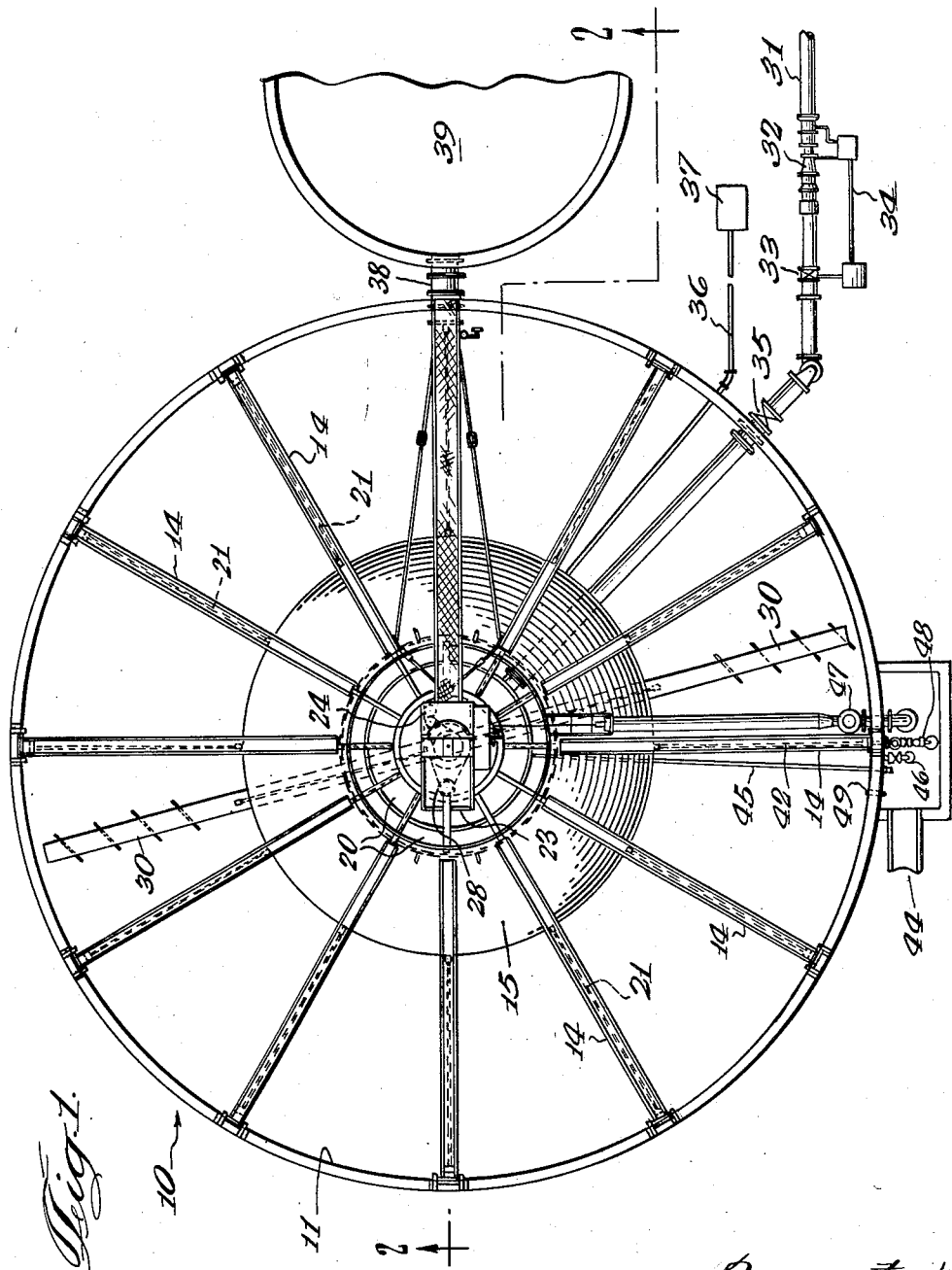

Feb. 19, 1957. J. GALANDAK 2,781,911
CLARIFIER CONSTRUCTION
Filed Aug. 2, 1954 2 Sheets-Sheet 2
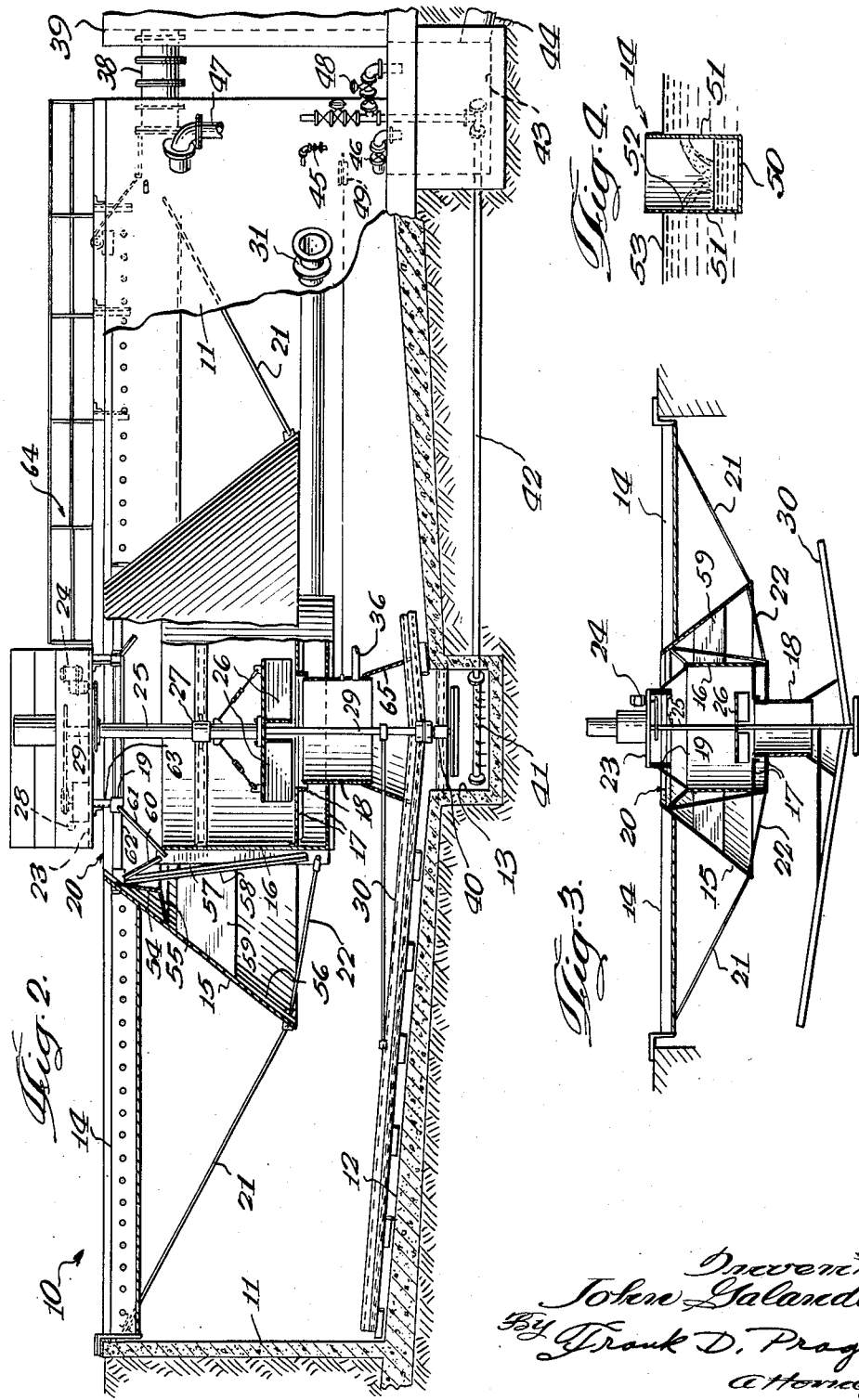

United States Patent Office 2,781,911
Patented Feb. 19, 1957

2,781,911
CLARIFIER CONSTRUCTION

John Galandak, Montclair, N. J., assignor to Graver Tank & Mfg. Co., Inc., East Chicago, Ind., a corporation of Delaware Application August 2, 1954, Serial No. 447,078

6 Claims. (Cl. 210—55)

This invention relates to a construction for large liquid clarifiers. It is particularly concerned with a construction for so-called slurry or upflow clarifiers, using heavy, central equipment units for mixing, recirculation, sludge impelling and other purposes. The construction is improved as to visibility of slurry, cost of structures, and otherwise.

The improvement has been achieved by a novel manner of supporting the central equipment units, making them substantially self-supporting and thereby dispensing with heavy, expensive and sight-obstructing supports previously used. A vertically inverted, peripherally distributed, submerged truss construction, largely consisting in the central equipment units themselves, is provided.

The details will best be explained in connection with a preferred, specific embodiment, which will now be described for illustrative purposes. In the drawing:

Figure 1 is a plan view of the preferred embodiment.

Figure 2 is an elevation in section taken along lines 2—2 in Figure 1.

Figure 3 is a simplified diagram of the structurally significant parts in Figure 2.

Figure 4 is a cross-section through one of said parts.

The new construction, as mentioned, serves large upflow clarifiers; that is, clarifiers such as that illustrated at 10 which cover a large ground area, for instance, a circle of about 50 to 100 feet diameter, or more, while using a more or less standardized depth such as about 10 to 15 feet.

The tank 10 is shown as having the usual, cylindrical side wall 11, which can be made unusually light and economical by virtue of the new construction, as will be explained, and which rises from the periphery of an approximately flat bottom 13. A central sump 12 is recessed into this bottom, for removal of excess sludge. The top of the tank is open in order to allow inspection of the slurry bed formed in the tank in the conventional manner to be mentioned; such inspection being one of the most important safeguards for successful operation of slurry clarifiers. The open top of the tank is shown adjacent the ground level, as usual in municipal installations. A large, circular liquid surface is the outstanding feature, readily seen upon inspection of the tank in use.

The new equipment construction

The aforementioned liquid surface is traversed by a system of straight, radial, horizontal channels or effluent collector launders 14. Figure 1 shows twelve such collectors, at equal angular distances from one another. They serve to withdraw treated liquid from the top of the tank. Since the liquid enters the tank at a lower level, as will be shown, the well-known upflow is enforced by these collectors. Since the slurry treatment is known to be much dependent on uniformity of upflow rates over the tank area it is important to keep said distances between collectors not only equal as mentioned but also relatively small. For instance, operating experience in water treatment for hardness removal has indicated that maximum distances between such launders should not be much more than 12 to 24 feet, or sometimes less, depending upon specific treatment problems. The relatively great number of launders, so required, in turn has been utilized structurally in the present invention.

Clearly visible from the top and centrally disposed in the tank is the top of a large, hollow, truncated cone 15. Below the liquid level, this cone extends outwards and downwards to an elevation suitably spaced above the bottom 12. It divides an inner mixing and recirculation zone from the outer upflow clarification zone in the tank. The inner zone in turn is subdivided into an innermost upflow part and a surrounding downflow part by a hollow, cylindrical partition 16, coaxial with the cone partition 15 and entirely immersed in the liquid.

In the present construction the channels 14, cone 15 and cylinder 16 are used to give structural support to their own substantial weight and that of other heavy part mounted thereon.

For this purpose a horizontal reinforcement ring is provided on the lower inside of the cylinder 16 by a pair of superposed, substantially flat, rigid plates 17, secured to and inwardly projecting from the inside bottom part of this cylinder in the manner of large, annular ribs. The inner, annular edges of these plates are coaxial with the cylinder 16 and are further reinforced by a cylinder 18 secured thereto and depending therefrom toward the sump 13. The parts 17 and 18 also serve as liquid and slurry inlets, for which reason the cylinder 18 is hollow and the attachment thereof with the upper plate 17 is perforated.

Coaxially with the ring 17 there is provided an upper rigid ring 19 within the top of the cone 15, above the cylinder 16. This upper ring is connected with the top edges of the cone and cylinder by a rigid spider construction, generally shown at 20.

The structural support system is basically completed by tension bars 21, 22. The tension bars 21 extend from outer parts of the launders 14, whereto they are directly or indirectly secured in known manner, inwards to bottom parts of the cone 15, similarly secured thereto. The additional, inner tension bars 22 similarly connect said bottom parts of the cone 15 with the bottom part of the cylinder 16 reenforced by the ring 17. The tension bars 22 and mainly the tension bars 21 extend from their outer ends with inward-downward slope, as suspension and tension members of inverted truss elements, radially converging toward the tank center. Their inward pull is transmitted by the radial launder channels 14 and spider 20 to the upper reenforcement ring 19. The weight of the entire system is transmitted to the ground by the various outer ends of the launders, which are suitably secured to the top of the wall 11.

An approximately rectangular platform 23 is shown as being supported by and above the upper reenforcement ring 19, by the spider 20. This platform provides support and access for the motorized equipment of the clarifier; mainly for the slurry mixer and recirculator motor 24. It also supports the equipment driven by this motor; that is, a central, hollow, vertical impeller shaft 25, rotatably depending from the platform 23 and carrying slurry impeller blades 26 adjacent and above the ring 17 to create central suction in the cylinder 18 and outward-upward discharge in the cylinder 16. The side thrust of the impeller is controlled by a lower impeller shaft guide bearing 27. The impeller unit 24, 25, 26, 27 for a large upflow clarifier is likely to represent a weight of several tons or even dozens of tons.

An additional heavy equipment unit supported on the platform 23 consists in the sludge scraper motor 28 and scraper equipment driven thereby; that is, a central, vertical shaft 29 extending through the hollow impeller shaft 25; a scraper truss 30 secured to the bottom end of the shaft 29 and extending across the tank bottom 12, with scraper blades on the underside of the truss to move settled sludge toward the bottom end of the recirculation inlet 18 and excess sludge to the sump 13. The reduction gearing, controls and other accessories of the motors 24, 28 and the weight of persons inspecting or servicing the same add further loads to the structural system. For servicing and accessibility the motors are desirably mounted some little distance from one another and connected with the central shafts by suitable transmissions. Eccentric weight and vibration loads are thus imposed on the system.

Heretofore a variety of attempts were made to solve the structural problems so presented. Conventionally, bridge trusses were erected above and across the tank to support the tank equipment. In ordinary gravity clarifiers they were and are fairly successful. In upflow clarifiers they interfered with liquid and slurry inspection, by crossing the line of sight to certain tank portions and creating reflections in others. They also represented enormous items of first cost for tank walls as well as equipment; they required frequent repainting because of the humidity and corrosion inherent in the operation of open-top clarifiers; and they were rather unsightly even when well painted and maintained.

Attempts were made to find support points for the equipment, between the tank walls, for instance by means of a central pier. This involved the use of an eccentric sludge sump, which is quite objectionable in slurry clarifiers. It also required expensive bearing and support constructions, and tended to impose tremendously concentrated loads on limited, central bottom areas, thereby adding to the ever-present danger of injury to the tank due to inequalities of effective uplift.

Still other designs were developed, which attempted to operate without sludge settling, thereby eliminating the sludge scraper truss and its weight and allowing the construction of support posts anywhere in the tank area. Such designs were developed particularly for slurry treatment. However, they were found unreliable and inefficient for such treatment when large tank areas were involved.

The new construction contributed by the present invention avoids all of the aforementioned defects, both functional and structural. It does so by converting the conventional, elevated, narrow truss or bridge into a submerged, inverted dome-type truss; and more particularly by forming the new truss largely from the functionally required equipment itself. It has been found that their own, functionally required weight and mass need not be increased for this purpose; on the contrary, the total mass of equipment and support members is reduced.

*The functionally required equipment*

In view of their familiarity to those skilled in the art only brief reference is believed to be necessary to the well-known, basic, functional parts, like the raw liquid inlet 31, its flow meter 32, flow regulator valve 33, interconnecting meter and valve instrumentation 34 and manual shut-off gate valve 35. It may be noted that the raw liquid from 31 etc. enters the tank through the inlet and reenforcement ring 17 and that the material of such ring—usually steel—must have a certain solidity and mass, for adequate corrosion resistance etc. A functionally adequate inlet ring 17 has been found more than adequate for its added structural service, imposed in accordance with this invention; and no extra material or cost is involved.

The liquid entering at 17 is mixed in cylinder 16 with slurry from cylinder 18, to which are added suitably selected chemicals or reagents, supplied through inlet means 36 from one or several feeder devices 37 to the cylinder 18. A slurry is formed in the liquid, by the action of the reagents etc., and is recirculated upwards through the cylinders 18, 16 and downwards through the cone 15 by the impeller 26, thereby building up the slurry particles and its entire body, which forms a slurry bed in the outer clarification zone in the tank. Here, the slurry is kept in partial suspension by the agitating effect of the recirculating flow and the lifting effect of the unflow of liquid from the bottom of the cone 15 to the launders 14, while heavy slurry particles settle as sludge, to be raked inwards by the scraper truss 30. They partly re-enter the slurry circulation at 18 while other parts—too heavy to be lifted and used—are removed through the sump 13.

In said sump, below a conventional bottom guide bearing 40, there may be installed a conventional sludge pickup or collector 41, which in turn may communicate by a pipe 42 with a sludge well 43 adjacent the tank periphery. That well discharges to suitable sewers 44. It may also receive the discharge of a skimmer connection 45, tank drain 46 and tank overflow 47. The flow of sludge may be controlled by suitable valving 48. Samplers 49 may also discharge into the well 43.

*Details of the new construction*

The overflow launders 14, as mentioned, serve to transmit inward force components from the outer ends of the suspension members 21 to the inner spider 20. A bending force is thus imposed on each launder, and of course a bending force is also imposed on each pair of diametrically opposite launders by the effect of the central weights thereon. In addition the effective weight of the launders themselves is subject to variation, depending on whether and to what extent they are immersed and filled. The launders, when functionally adequate, are structurally quite sufficient to absorb the variable loads so defined; it being necessary to construct them of metal plate or the like, with sufficient solidity and mass to resist the highly corrosive conditions to which the launders are exposed.

As shown in Figure 4, each launder has a bottom wall 50 and a pair of side walls 51 upstanding therefrom, thus forming a channel both structurally and functionally and providing substantial compressive strength and bend resistance. It may further be noted that for reasons mentioned, numerous channels 14 are functionally required, so that they can be made fairly narrow and strong whereas the structural load imposed on each is quite small.

Preferably orifices 52 are formed in the launder side walls 51, slightly below the liquid level 53 (said level being maintained by controls not shown in detail). This arrangement minimizes the disturbance of clarification and slurry treatment which may otherwise be created in an open tank due to wind. No practical weakening of the structural channel effect is involved.

The inward push of the launders is absorbed at their inner ends by the top of the cone 15, which accordingly must be reinforced against radial, local loads. Such reinforcement as well as the collection of the treated liquid from the launders is achieved by an annular flume, formed by a vertical wall 54 of cylindrical shape and a more or less flat, lower, annular wall 55; this flume communicating with the inner end of each launder 14 to receive collected liquid therefrom, and also suitably communicating with the outside of the tank, as by outlet duct 39 discharging into clearwell 38.

Reinforcement of lower parts of the cone 15 usually is provided, for the safe support of the cone itself, by ribs 56 installed in inclined radial positions. The tension bars 21 and 22 are desirably connected with the cone 15 at the bottom ends of the ribs 56.

Similar ribs 57 are here provided along the outside of the cylinder 16. In addition, structural members 58 are provided to form in effect, diagonal braces between the upper and lower ends of the cone and cylinder ribs 56, 57. Still further, plates 59 are vertically installed between the partitions 15, 16 to serve as baffles, protecting the slurry bed in the clarifier from undue rotation and agitation. These plates may also contribute to the reinforcement of the center structure, although this is not essential.

Thus the partitions and launders 15, 16, 14 are made substantially self-supporting, with the mere addition of slender tension members 21, 22 and small structural elements 57, 58, which are incomparably cheaper than the conventional bridges or piers, while allowing better operation of the tank.

The spider 20 comprises a series of triangulated truss elements, each comprising a structural member 60 connecting the top of cylinder rib 57 with the top of cone rib 56; a second structural member 61 connecting the top of cylinder rib 57 with the upper reinforcement ring 19; and a third structural member 62 interconnecting the upper ends of the elements 60 and 61. By such means the partition structure 15, 16 becomes a very strong, central, structural unit, while no interference is offered to the recirculating flow from cylinder 16 to cone 15, which rises spirally to mix and treat the slurry and its various constituents.

Short posts 63 connect the platform 23 with the ring 19. A light, radial bridge 64 leads from a suitable part of the wall 11 to the platform 23. It may have intermediate support from one of the launders 14 if required. Thus it can be made smaller, lighter and cheaper than the bridge trusses formerly used.

Various other details might be noted. For instance, it may be desirable to provide a small cone 65, rotating with and on the center of the scraper truss 30, and fitting the bottom end of the stationary cylinder 18, in order to insure pick-up and recirculation of relatively large slurry particles, which facilitates the starting of the treatment process. A number of similar additions may be made, or modifications applied.

I claim:

1. A slurry clarifier comprising a side wall and a connected bottom forming a large upwardly open tank, said tank having a diameter substantially greater than the depth and being arranged to contain liquid to be clarified, a generally central structural unit comprising annular partition means normally submerged in the liquid and extending from the top surface thereof downwardly to points spaced from and above the bottom, said partition means being substantially spaced from said side walls, movable sludge impeller devices comprising a sludge scraper truss directly above the bottom and a liquid impeller above the truss, overflow collector launders normally submerged in the liquid and distributed over the area of the tank and horizontally extending from and connected to upper parts of the side wall and said central unit, a plurality of structural tension means peripherally distributed about the tank and having adjacent ends thereof connected to said unit and other ends thereof operatively connected to said side wall and providing the sole support for said unit, a central vertical shaft for rotating the truss, means on the central unit to drive the shaft, motor means above the top of the tank, and a second shaft connecting the motor means to the impeller to drive the latter.

2. A slurry clarifier as defined in claim 1, wherein the central unit comprises a truncated hollow cone, a hollow cylinder coaxially therein and surrounding the liquid impeller and cross-bracing means between the top and bottom of the cylinder and cone.

3. A slurry clarifier as defined in claim 2, also comprising a reinforcement ring secured to the bottom part of the hollow cylinder and tension means connecting inner end parts of the first-mentioned tension means with said ring.

4. A slurry clarifier as defined in claim 3, wherein the raw liquid inlet means discharges through the reinforcement ring into the hollow cylinder.

5. A slurry clarifier as described in claim 2, wherein the central unit also comprises vertical baffle plate means extending between the cylinder and the cone.

6. A slurry clarifier as described in claim 2, wherein the sludge impeller devices comprise a central, vertical shaft, a vertical structure surrounding the central shaft, and a sludge scraper truss secured to the bottom end of the central shaft; the liquid impeller being secured to the surrounding structure above the sludge scraper truss.

References Cited in the file of this patent

UNITED STATES PATENTS

| | | |
|---|---|---|
| 1,357,587 | Peck | Nov. 2, 1920 |
| 2,021,672 | Spaulding | Nov. 19, 1935 |
| 2,185,785 | Dorr et al. | Jan. 2, 1940 |
| 2,245,583 | Green | June 17, 1941 |
| 2,391,738 | Prager | Dec. 25, 1945 |